United States Patent
Hermanns (10) Patent No.: US 9,870,202 B2
(45) Date of Patent: Jan. 16, 2018

(54) BUSINESS OBJECT MODEL LAYER INTERFACE

(71) Applicant: Marcel Hermanns, Heidelberg (DE)

(72) Inventor: Marcel Hermanns, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/303,563

(22) Filed: Jun. 12, 2014

(65) Prior Publication Data

US 2015/0160928 A1 Jun. 11, 2015

Related U.S. Application Data

(60) Provisional application No. 61/912,290, filed on Dec. 5, 2013, provisional application No. 61/912,254, filed on Dec. 5, 2013, provisional application No. 61/912,287, filed on Dec. 5, 2013.

(51) Int. Cl.
 *G06F 9/44* (2006.01)
 *G06F 17/30* (2006.01)
 *G06F 9/45* (2006.01)

(52) U.S. Cl.
 CPC .......... *G06F 8/20* (2013.01); *G06F 8/22* (2013.01); *G06F 17/30294* (2013.01); *G06F 17/30604* (2013.01); *G06F 8/24* (2013.01); *G06F 8/40* (2013.01)

(58) Field of Classification Search
 CPC .............................................. G06F 8/10–8/78
 See application file for complete search history.

(56) References Cited

U.S. PATENT DOCUMENTS

| | | | |
|---|---|---|---|
| 5,550,971 A | 8/1996 | Brunner et al. | |
| 7,415,484 B1 | 8/2008 | Tulkoff et al. | |
| 7,734,619 B2 | 6/2010 | Vierich et al. | |
| 8,387,030 B2 | 2/2013 | Brunswig et al. | |
| 8,412,549 B2* | 4/2013 | Graeber | G06Q 10/06 705/7.11 |
| 8,577,991 B2* | 11/2013 | Rehmann | G06F 8/10 709/217 |
| 9,069,645 B2* | 6/2015 | Kemmler | G06F 8/20 |
| 9,223,549 B1 | 12/2015 | Hermanns et al. | |
| 9,280,788 B2 | 3/2016 | Ferrari et al. | |

(Continued)

OTHER PUBLICATIONS

Gavalas, Damianos et al., "Development Platforms for Mobile Applications: Status and Trends," 2011, pp. 77-86.*

(Continued)

*Primary Examiner* — Thuy Dao
*Assistant Examiner* — Christopher Franco
(74) *Attorney, Agent, or Firm* — Brake Hughes Bellermann LLP (57) ABSTRACT

A method includes identifying a plurality of consumption layer objects, at least two of the plurality of consumption layer objects being associated with a different framework and each of the plurality of consumption layer objects include a plurality of business objects, generating a plurality of interface objects each corresponding to a framework, each of the plurality of interface objects being configured to translate each of the business objects to a common intermediate representation, associating metadata with the plurality of interface objects, and associating a runtime interface with the plurality of interface objects.

18 Claims, 7 Drawing Sheets

(56) References Cited

U.S. PATENT DOCUMENTS

| | | | |
|---|---|---|---|
| 9,336,023 B2* | 5/2016 | Mukkamala | G06F 8/20 |
| 2002/0111995 A1 | 8/2002 | Mansour et al. | |
| 2003/0004809 A1 | 1/2003 | Palcic et al. | |
| 2003/0074352 A1 | 4/2003 | Raboczi et al. | |
| 2004/0103100 A1 | 5/2004 | Levine | |
| 2004/0148586 A1* | 7/2004 | Gilboa | G06F 8/38 |
| | | | 717/108 |
| 2004/0181471 A1* | 9/2004 | Rogers | 705/31 |
| 2004/0187140 A1* | 9/2004 | Aigner et al. | 719/328 |
| 2004/0250238 A1* | 12/2004 | Singh et al. | 717/108 |
| 2005/0120051 A1 | 6/2005 | Danner et al. | |
| 2005/0172261 A1 | 8/2005 | Yuknewicz et al. | |
| 2005/0177601 A1 | 8/2005 | Chopra et al. | |
| 2006/0074967 A1 | 4/2006 | Shaburov | |
| 2008/0163253 A1* | 7/2008 | Massmann | G06F 9/4435 |
| | | | 719/316 |
| 2008/0313595 A1* | 12/2008 | Boulineau | G06F 8/20 |
| | | | 717/101 |
| 2010/0049734 A1 | 2/2010 | Wintel et al. | |
| 2010/0058113 A1* | 3/2010 | Rapp et al. | 714/38 |
| 2010/0107136 A1 | 4/2010 | Fildebrandt et al. | |
| 2010/0251129 A1* | 9/2010 | Beringer | G06F 17/30607 |
| | | | 715/738 |
| 2011/0161940 A1* | 6/2011 | Brunswig | G06F 8/41 |
| | | | 717/139 |
| 2011/0161942 A1 | 6/2011 | Brunswig et al. | |
| 2011/0219154 A1* | 9/2011 | Bykov | H04L 69/326 |
| | | | 710/105 |
| 2011/0282704 A1* | 11/2011 | Graeber | G06Q 10/06 |
| | | | 705/7.11 |
| 2012/0054262 A1 | 3/2012 | Demant et al. | |
| 2012/0089534 A1* | 4/2012 | Liebig et al. | 705/348 |
| 2012/0102451 A1* | 4/2012 | Kulkarni | G06F 8/24 |
| | | | 717/102 |
| 2012/0110468 A1* | 5/2012 | Ackermann et al. | 715/747 |
| 2012/0117121 A1 | 5/2012 | Thomas et al. | |
| 2012/0137271 A1* | 5/2012 | Kemmler | G06F 8/72 |
| | | | 717/120 |
| 2012/0158797 A1 | 6/2012 | Hermanns et al. | |
| 2012/0198416 A1 | 8/2012 | Sirr et al. | |
| 2012/0324421 A1 | 12/2012 | Boeckenhauer et al. | |
| 2013/0013649 A1* | 1/2013 | El Husseini | G06Q 10/10 |
| | | | 707/804 |
| 2013/0031565 A1* | 1/2013 | Wachter | G06F 8/38 |
| | | | 719/313 |
| 2013/0124611 A1* | 5/2013 | Thormaehlen | G06F 8/30 |
| | | | 709/203 |
| 2013/0159037 A1* | 6/2013 | Keil et al. | 705/7.12 |
| 2013/0159909 A1 | 6/2013 | Kornmann et al. | |
| 2013/0179229 A1* | 7/2013 | Graeber | G06Q 10/06 |
| | | | 705/7.36 |
| 2013/0326464 A1 | 12/2013 | Hermanns et al. | |
| 2014/0181005 A1 | 6/2014 | Baumgaertel et al. | |
| 2014/0181788 A1 | 6/2014 | Sullivan et al. | |
| 2014/0330745 A1* | 11/2014 | Hampapur et al. | 705/348 |
| 2015/0074136 A1 | 3/2015 | Falter et al. | |
| 2015/0081658 A1 | 3/2015 | Meyles et al. | |
| 2015/0160814 A1 | 6/2015 | Hermanns et al. | |
| 2015/0161180 A1 | 6/2015 | Hermanns et al. | |

OTHER PUBLICATIONS

Dalmasso, Isabelle et al., "Survey, Comparison and Evaluation of Cross Platform Mobile Application Development Tools," Jul. 2013, pp. 323-328.*

Wasserman, Anthony I., "Software Engineering Issues for Mobile Application Development," 2010, pp. 397-400.*

Smutny, Pavel, "Mobile development tools and cross-platform solutions," 2012, pp. 653-656.*

Savolainen, Juha et al., "Developing Platforms for Multiple Software Product Lines," 2012, pp. 220-228.*

Muller, Thomas et al., "Virtualization Techniques for Cross Platform Automated Software Builds, Tests and Deployment," 2009, pp. 73-77.*

Non Final Office Action for U.S. Appl. No. 14/303,564, dated May 11, 2017, 14 pages.

Non Final Office Action for U.S. Appl. No. 14/303,565, dated Jun. 1, 2017, 27 pages.

Non Final Office Action for U.S. Appl. No. 14/303,565, dated Sep. 2, 2016, 18 pages.

Response to Non Final Office Action for U.S. Appl. No. 14/303,565, filed Dec. 1, 2016, 11 pages.

Final Office Action for U.S. Appl. No. 14/303,565, dated Feb. 22, 2017, 23 pages.

Notice of Allowance for U.S. Appl. No. 14/303,564, dated Nov. 8, 2017, 14 pages.

Final Office Action for U.S. Appl. No. 14/303,565, dated Oct. 19, 2017, 27 pages.

Response to Non Final Office Action for U.S. Appl. No. 14/303,565, filed on Aug. 31, 2017, 11 pages.

* cited by examiner

BUSINESS OBJECT MODEL LAYER INTERFACE

This application claims the benefit of U.S. Provisional Patent Application 61/912,290 filed on Dec. 5, 2013 entitled "ADVANCED BUSINESS APPLICATION PROGRAMMING (ABAP) QUERY INTERFACE", U.S. Provisional Patent Application 61/912,254 filed on Dec. 5, 2013 entitled "SERVICE ADAPTION LANGUAGE (SADL) ENTITY" and U.S. Provisional Patent Application 61/912,287 filed on Dec. 5, 2013 entitled "SERVICE ADAPTION LANGUAGE (SADL) AS A TIMELESS CONSUMPTION LAYER", the entire contents each of which are incorporated herein by reference. This application is related to application entitled "CONSUMPTION LAYER FOR BUSINESS ENTITIES", and application entitled "CONSUMPTION LAYER QUERY INTERFACE", the entire contents each of which are incorporated herein by reference.

FIELD

Embodiments relate to computing, and in particular, to systems and methods for decoupling of consumption and business model layers.

BACKGROUND

Databases and business objects are highly useful tools allowing users to manage complex relationships between large amounts of different types of data. When a large volume of data is requested to be read, analyzed, and returned in a de-normalized view from the database, in general user interface (UI) will formulate a use scenario, such as a query, search, or free search having features, to the database. The database can include a large number of instantiated business objects, entities that include attributes and associations with other business objects.

Typically, different data models and business object frameworks are implemented in a complex architecture. For example, an integration of each business model into different user interface (UI) technologies can include complex integrations with differing frameworks. Therefore, systems implemented using the UI technologies and the different business models result in different components and the point-to-point integrations. The point-to-point integrations can result in a high total cost of development (TCD) for the business object framework development, maintenance, and the integration effort for the system. Experiences for application developers can be less than ideal, because each of the different integrations have no harmonized look and feel. Again this can results in a high TCD for the developer as well as any partners and/or customers, because no common concepts, tooling and integrations are in place in the current art. As a result a developer has to learn point to point integration. In addition, a combination of different integrations may not be possible or may require a significant amount of manual effort.

SUMMARY

One embodiment includes a method. The method includes identifying a plurality of consumption layer objects, at least two of the plurality of consumption layer objects being associated with a different framework and each of the plurality of consumption layer objects include a plurality of business objects, generating a plurality of interface objects each corresponding to a framework, each of the plurality of interface objects being configured to translate each of the business objects to a common intermediate representation, associating metadata with the plurality of interface objects, and associating a runtime interface with the plurality of interface objects.

Implementations can include one or more of the following features. For example, translating each of the business objects into the intermediate representation includes converting data objects into a data structure. Translating each of the business objects into the intermediate representation includes converting data objects into metadata. Translating each of the business objects into the intermediate representation includes translating code associated with a procedure into a string of symbols having a common or standard language. Translating each of the business objects into the intermediate representation includes a mapping of relationships between business objects.

For example, translating each of the business objects into the intermediate representation includes using a unique translation scheme for each framework. Translating each of the business objects into the intermediate representation includes generating a Service Adaptation Definition Language (SADL) definition for each of the business objects. Associating metadata with the plurality of interface objects includes specifying a SADL data source. Translating each of the business objects into the intermediate representation decouple each of the business objects from the associated framework used to implement each of the business objects.

Another embodiment includes a non-transitory computer-readable storage medium having stored thereon computer executable program code which, when executed on a computer system, causes the computer system to perform steps. The steps include identifying a plurality of consumption layer objects, at least two of the plurality of consumption layer objects being associated with a different framework and each of the plurality of consumption layer objects include a plurality of business objects, generating a plurality of interface objects each corresponding to a framework, each of the plurality of interface objects being configured to translate each of the business objects to a common intermediate representation, associating metadata with the plurality of interface objects, and associating a runtime interface with the plurality of interface objects.

Implementations can include one or more of the following features. For example, translating each of the business objects into the intermediate representation includes converting data objects into a data structure. Translating each of the business objects into the intermediate representation includes converting data objects into metadata. Translating each of the business objects into the intermediate representation includes translating code associated with a procedure into a string of symbols having a common or standard language. Translating each of the business objects into the intermediate representation includes a mapping of relationships between business objects.

For example, translating each of the business objects into the intermediate representation includes using a unique translation scheme for each framework. Translating each of the business objects into the intermediate representation includes generating a Service Adaptation Definition Language (SADL) definition for each of the business objects. Associating metadata with the plurality of interface objects includes specifying a SADL data source. Translating each of the business objects into the intermediate representation decouple each of the business objects from the associated framework used to implement each of the business objects.

Yet another example embodiment includes an apparatus. The apparatus includes a processor, a non-transitory computer readable medium and a business entity. The business entity is configured to implement a plurality of model layer objects in a common structure such that a consumption layer object utilizes a single structure in order to interface with each of the plurality of model layer objects. The business entity includes a runtime engine configured to accessing data associated with a business object associated with one or more of the of the plurality of model layer objects and metadata associated with each of the plurality of interface objects, the metadata including references to the business, at least one business object association, elements of the business object and function calls in the business object.

Implementations can include one or more of the following features. For example, the business entity is further configured to decouple each of the business objects from the associated framework used to implement each of the business objects. The runtime accesses a service manager for a model layer framework to implement a service. At least two of the plurality of consumption layer objects are associated with a different model layer framework and each of the plurality of consumption layer objects include a plurality of business objects.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity.

DETAILED DESCRIPTION OF THE EMBODIMENTS

There is a need for systems and methods that improve integrating UI technologies and the different business models and frameworks.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. The use of similar or identical reference numbers in the various drawings is intended to indicate the presence of a similar or identical element or feature.

Figure 1A:
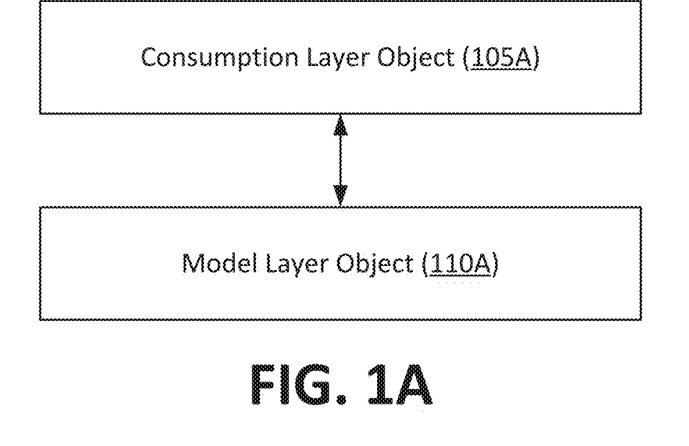
FIGS. 1A and 1B illustrate a block diagram of an interaction between objects according to at least one example embodiment.
Figure 1B:
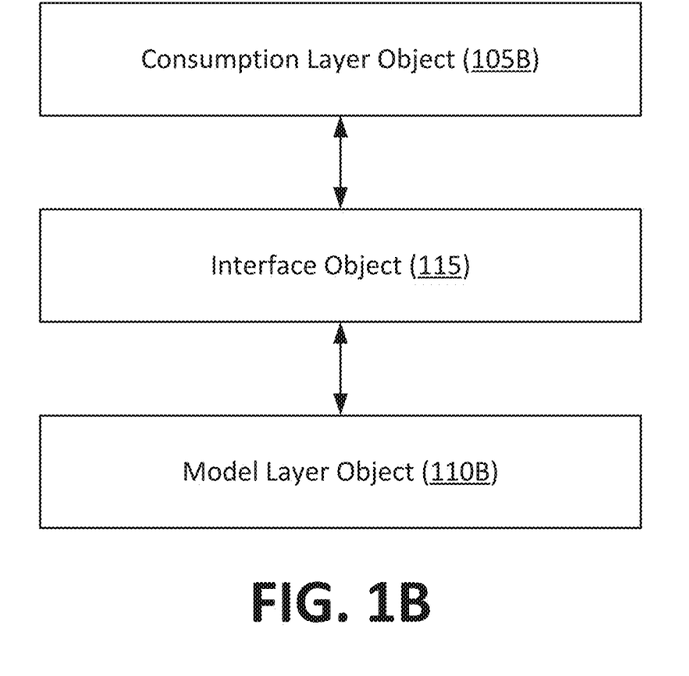

FIGS. 1A and 1B illustrate a block diagram of an interaction between objects according to at least one example embodiment. As shown in FIG. 1A a consumption layer object 105A is communicatively coupled with a model layer object 110A. In the example of FIG. 1A, the consumption layer object 105A may be any object (e.g., an element of a computing system) configured to consume (e.g., read, write, update, etc.) data. The model layer object 110 may be a business object (e.g., a class of objects) defining objects of the business world including, for example, a data model, functions, relationships and an associated business logic (described in more detail below with regard to FIG. 2). The model layer object 110A may be implemented on a framework (e.g., Advanced Business Application Programming (ABAP)). In one or more example implementations, there may be several frameworks on which several model layer objects 110A are implemented. Accordingly, developing consumption layer objects 105A may require special knowledge of and special skill for utilizing each of the several model layer objects 110A.

Therefore, example implementations may include an interface object 115 configured to implement several model layer objects 110B in a common structure such that consumption layer objects 105B may utilize a single structure in order to interface with several model layer objects 110B. In other words, interface object 115 presents a uniform structure or framework utilized by a developer of a consumption layer object 105B. In other words, a business object associated with a model layer object 110B may be de-coupled from the framework used to implement the business object such that a developer of a consumption layer object 105B needs no special knowledge of and/or special skill in order to utilize the business object.

Figure 2:
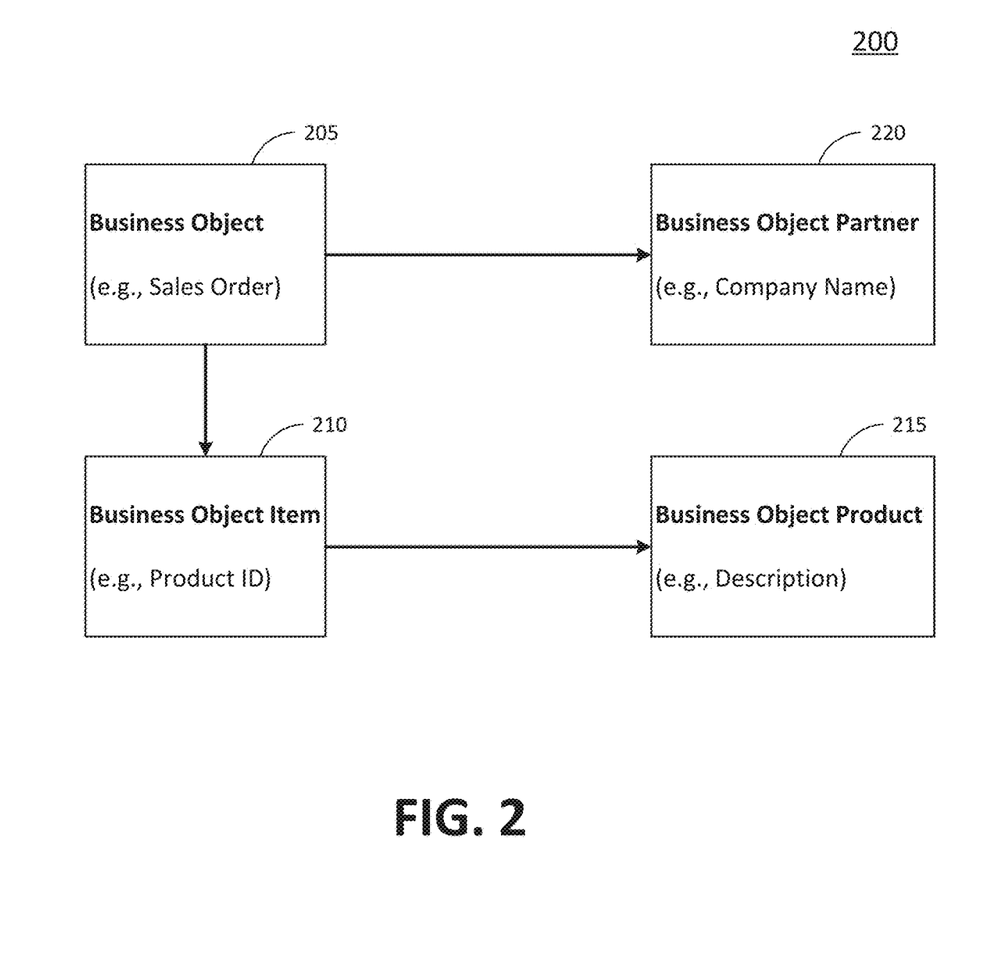
FIG. 2 illustrates a block diagram of a business object data model according to at least one example embodiment.

FIG. 2 illustrates a block diagram of a business object data model according to at least one example embodiment. A notation for describing data models in relational database management systems is sometimes called Entity-Relationship Diagrams (ER-Diagrams). ER-Diagrams may be used to design database tables and their relationships. In several object-oriented programming languages technologies exist that map these data models to class references or representations of the programming language sometimes called OR-Mapping. A business object (e.g., in object-oriented software development) describes objects of the business world including, for example, a data model, functions, relationships and an associated business logic (e.g., BOPF).

As shown in FIG. 2 a business object data model 200 may be, for example, related to a sales object. The business object data model 200 may include at least one business object. For example, the business object data model 200 may include a business object 205 (e.g., sales order), a business object product 215 and a business object partner 220. A business object item 210 and the business object partner 220 may be nodes of the business object 205 (e.g., sales order). Further, the business object item 210 may also have an associated node (e.g., business object product 215). In the example of FIG. 2, the business object 205 may be a sales order object. However, other business objects are within the scope of this disclosure. The business object 205 may link to the business object partner 220 in order to, for example, indicate a business partner (e.g., customer) that has placed a sales order. The business object 205 may link to the business object item 210 (e.g., a sales order item) in order to indicate what is ordered. The business object item 210 may indicate, for example, a Product ID, a quantity ordered (e.g., GrossAmount, NetAmount), and/or the like. The business object item 210 may link to the business object product 215. The business object product may indicate internal information about the ordered product (e.g., ID, Description, and/or the like).

In some systems the business objects (e.g., business object 205, business object item 210, and the like) may be elements of different systems (e.g., sales order management (SO) systems, product management systems, inventory management systems, enterprise resource planning (ERP) systems, and the like). Accordingly, business objects may be implemented on different frameworks or model layers (e.g., model layer object 110A). For example, the frameworks may include business object processing framework (BOPF), business object layer (BOL), service provider interface (SPI), a core data system (CDS), HANA views, and the like. Therefore, in order to integrate the sales object, a developer may require special knowledge of and special skill for utilizing each of the frameworks.

However, according to example embodiments, an interface object or framework or entity (e.g., interface object 115) may be used to de-couple the business object from the framework used to implement the business object such that a developer needs no special knowledge of and/or special skill in order to utilize the business object. In other words, the developer may only need the skills associated with a single interface (e.g., interface object 115) instead of the skills associated with the many frameworks that business objects can be associated with.

Figure 3A:
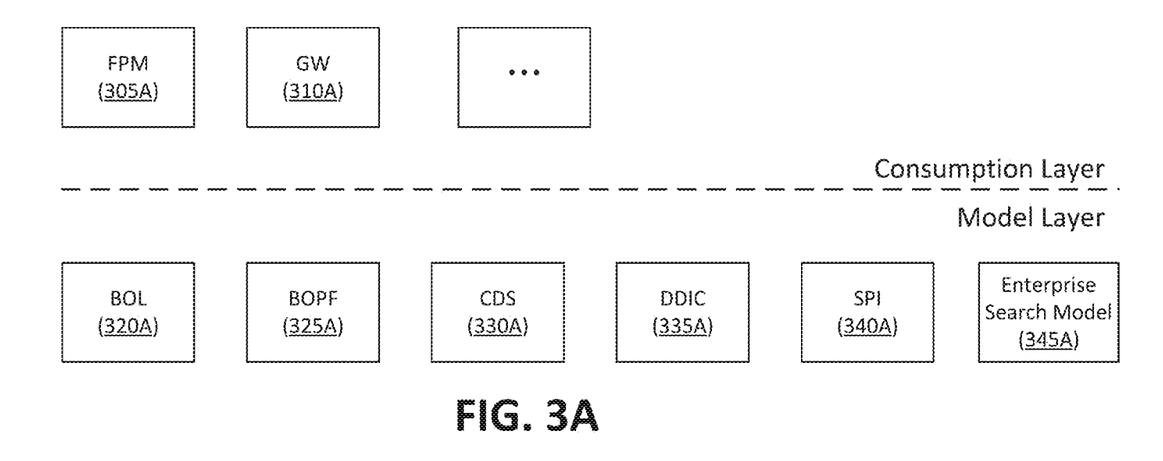
FIGS. 3A and 3B illustrate block diagrams of consumption layer objects and model layer frameworks.
Figure 3B:
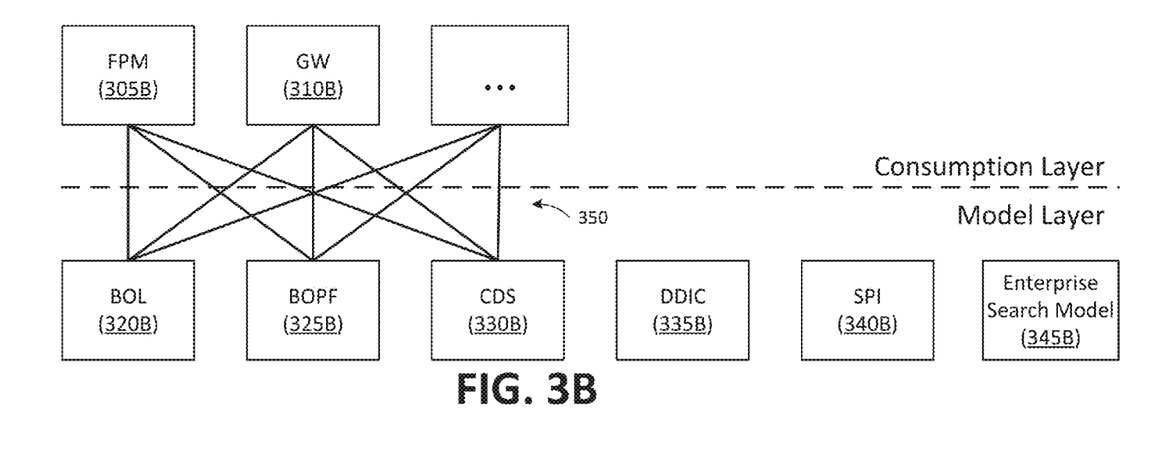

FIGS. 3A and 3B illustrate block diagrams of consumption layer objects and model layer frameworks. In the example shown in FIGS. 3A and 3B, there are several blocks associated with a consumption layer and there are several blocks associated with a model layer. The blocks associated with the consumption layer include floor plan manager (FPM) 305A, 305B (e.g., SAP Floor Plan Manager®), gateway (GW) 310A, 310B (e.g., NetWeaver Gateway®), and the like.

FPM is a framework for developing self-service applications using Web Dynpro® for Java®. FPM is configured to ensure that self-service applications follow a consistent pattern or road map. GW is a set of add-ons configured to provide the ability to make an HTTP(S) request in order to access data.

The blocks associated with the model layer include business object layer (BOL) 320A, 320B, business object processing framework (BOPF) 325A, 325B, core data services (CDS) 330A, 330B, data dictionary (DDIC) 335A, 335B, service provider infrastructure (SPI) 340A, 340B, enterprise search model 345A, 345B, and the like.

In order to abstract from different DBMS DDIC is a native Advanced Business Application Programming (ABAP) component configured to define database tables and views. These tables and views can natively be handled in ABAP as first class citizens. Persistence classes in object oriented (OO) ABAP provides classes that are representations of tables. The classes combine data models with business logic. ABAP persistence classes are a typical OR-Mapping infrastructure.

Business Object Processing Framework (BOPF) is a framework configured to provide an end-to-end development experience. BOPF supports the modeling of the data model and takes care for the persistency. BOPF enables the implementation of business logic as actions, determinations and validations. BOPF is also configured to enable a consistent logical unit of work (LUW) handling (e.g., the span of time during which any database updates must be performed). Business Object Layer (BOL) is an abstraction layer for legacy code. BOL provides an infrastructure to build a business model on top of legacy code with a harmonized Application Programming Interface (API) configured to enable a model-based consumption in higher layers. The framework supports LUW/transactional handling but does not care about the way the data is persisted.

Service Provider Interface (SPI) is similar to BOL but does not provide design time to model business objects. The SPI is defined via APIs. Enterprise Search Model is an infrastructure supporting fast search and query operations on replicated data in Text Retrieval and information Extraction (TREX) (e.g., a search engine) or on original data in a High Performance Analytic Appliance (HANA) (e.g., an in-memory, column-oriented, relational database management system). The enterprise search model is an infrastructure configured to support fast search and query operations on replicated data. Enterprise search models are views on the data that can be connected with associations. Therefore, Enterprise Search Model can be described as Business Objects without business logic. The associations are used for navigation purposes on generic applications consuming these models.

A Business Object Repository (BOR) is a registry for function modules. BOR functions can be registered to enable a harmonized consumption. A core data services (CDS) is a concept for HANA and ABAP on HANA in order to describe business objects as first class citizens. CDS is configured to enable the definition of query languages native syntax to work with the business objects.

As shown in FIG. 3B, one or more of the FPM 305B, GW 310B, and the like may be communicatively coupled to one or more of the BOL 320B, BOPF 325B, CDS 330B, DDIC 335B, SPI 340B, enterprise search model 345B, and the like. Typically the coupling is via a software interface (e.g., custom software code) that is different for each coupled pairing. In other words, the interface coupling FPM 305B to BOL 320B is different than the interface coupling FPM 305B to BOPF 325B. Because the interface coupling is different for each coupled pairing, developing consumption layer objects (e.g., FPM 305B, GW 310B, and the like) may require special knowledge of and/or special skill for utilizing each of the several model layer objects (e.g., BOL 320B, BOPF 325B, CDS 330B, DDIC 335B, SPI 340B, enterprise search model 345B, and the like).

Figure 4:
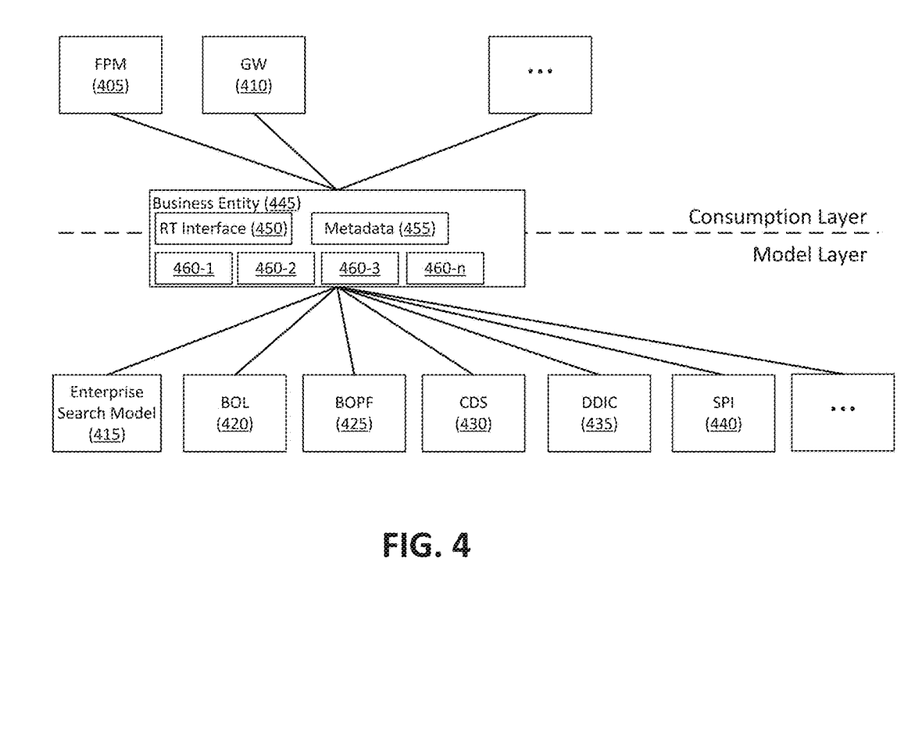
FIG. 4 illustrates a block diagram of a Business Entity interfacing between consumption layer objects and model layer frameworks according to at least one example embodiment.

FIG. 4 illustrates a block diagram of a business entity interfacing between consumption layer objects and model layer frameworks according to at least one example embodiment. In the example shown in FIG. 4, there are several blocks associated with a consumption layer and there are several blocks associated with a model layer. The blocks associated with the consumption layer include floor plan manager (FPM) 405 (e.g., SAP Floor Plan Manager®), gateway (GW) 410 (e.g., NetWeaver Gateway®), and the like. The blocks associated with the model layer include enterprise search model 415 (e.g., NetWeaver Enterprise Search®), business object layer (BOL) 420, business object processing framework (BOPF) 425, core data services (CDS) 430, data dictionary (DDIC) 435, service provider infrastructure (SPI) 440, and the like. Straddling the consumption layer and the model layer is a business entity 445 module or object or abstraction. Business entity 445 may be configured to implement several model layer objects (e.g., enterprise search model 415, BOL 420, BOPF 425, CDS 430, DDIC 435, SPI 440, and the like) in a common structure such that consumption layer objects (e.g., FPM 405, GW 410, and the like) may utilize a single structure in order to interface with several model layer objects. In other words, business entity 445 presents a uniform structure or framework utilized by a developer of a consumption layer object (e.g., FPM 405). In other words, a business object associated with a model layer object (e.g., BOL 420) may be de-coupled from the framework used to implement the business object such that a developer of a consumption layer object (e.g., FPM 405) needs no special knowledge of and/or special skill in order to utilize the business object.

Accordingly, business entity 445 may be a framework configured to enable consumption of different business object models, and other entity-based models, for example, DDIC tables and views, in a uniform way. Knowledge of the details of the modeling frameworks, such as BOPF or BOL is not required, as such the business entity 445 model exposes all the required information to a user interface configured to develop consumption layer objects (e.g., FPM 405).

Business entity 445 can be implemented using a data access service (DAS) layer of a service adaptation system. In an example implementation, data can be stored in service data objects (SDOs), which can be internally-based on an ABAP table format. Data access to these SDOs can be provided by one or more available application programming interfaces (API) to facilitate good performance, convenience of data access, and a broader range of data access tools and features to different data users via multiple, possibly incompatible, consumer runtime environments (e.g., FPM 405) that are not native to the data format used by objects in the model layer (e.g., BOL 420). A business entity 445 can also be provided as an Extensible Markup Language (XML) that provides broad feature set support, repository integration, flexibility facilities, and the like.

As such, business entity 445 includes a runtime interface 450, metadata 455 and at least one interface 460 (e.g., interface 460-1, 460-2, 460-3, . . . , 460-n). The runtime interface 450 may be configured to interface with at least one interface 460 and at least one consumption layer tool during an implemented operation (e.g., accessing data associated with a business object). For example, the FPM may be configured to update an element data entry (e.g., completion date). Accordingly, the runtime interface 450 may be configured to receive (or otherwise acquire) the element to be updated and the new data. The runtime interface 450 may access the appropriate interface 460 and call, implement and/or execute the function, code, tool, and/or the like associated with the interface 460 for updating the element data entry. For example, in an interpreted environment the runtime interface 450 may map a function, code and/or tool associated with a business object. For example, in a compiled environment, the runtime interface 450 may be compiled together (e.g., as source code) with the interface 460 to include the function, code and/or tool associated with a business object.

Metadata 455 may include any data and/or data associations for the runtime interface 450, the interface 460, and/or objects in the model layer (e.g., BOL 420). For example, metadata 455 may include business objects in an object in the model layer, business object associations (e.g., as an ER-diagram), elements of a business object, function calls in a business object, and/or the like. The at least one interface 460 may be configured to implement several model layer objects (e.g., BOL 420) in a common structure such that consumption layer objects may utilize a single structure in order to interface with several model layer objects. In other words, the interface 460 presents a uniform structure or framework utilized by a developer of a consumption layer object. In other words, a business object associated with a model layer object may be de-coupled from the framework used to implement the business object such that a developer of a consumption layer object needs no special knowledge of and/or special skill in order to utilize the business object.

Figure 5:
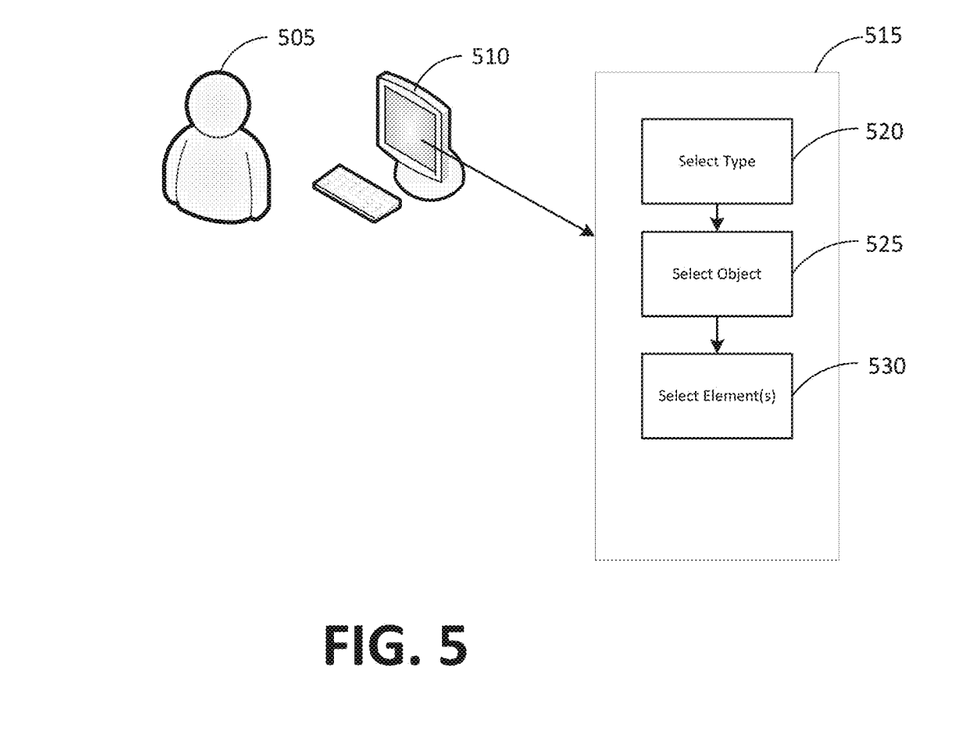
FIG. 5 illustrates a block diagram of a developer using the Business Entity according to at least one example embodiment.

FIG. 5 illustrates a block diagram of a developer using an interface according to at least one example embodiment. As shown in FIG. 5 a developer 505 is using a computing device 510. The computing device 510 (e.g., a processor associated therewith) may be executing a program associated with a consumption layer. For example, the computing device 510 may be executing SAP Floor Plan Manager®. A window, panel, drop down, and/or the like (e.g., window 515) may show a list of model layer object types 520 (e.g., as an expandable list) showing objects associated with a model layer. Each of the model layer object types 520 may be implemented of a different framework. For example, the business partner business object may be implemented on a different framework than the product business object. The developer can access the model layer object types 520 without knowledge of how to implement the underlying framework for each of the model layer object types 520. Accordingly, the developer 505 may select or choose, using the program associated with a consumption layer, one or more of the model layer object types in, for example, a user interface and/or a query. In other words, the developer 505 can select an interface (e.g., interface 460-1).

Once the model layer object type 520 is selected, a business object 525 from the selected model layer object type 520 is selected. For example, a sales order business object may be selected. Finally, an element 530 is (or elements are) selected. For example, a sales order item or an update sales order item may be selected from the sales order business object.

Figure 6:
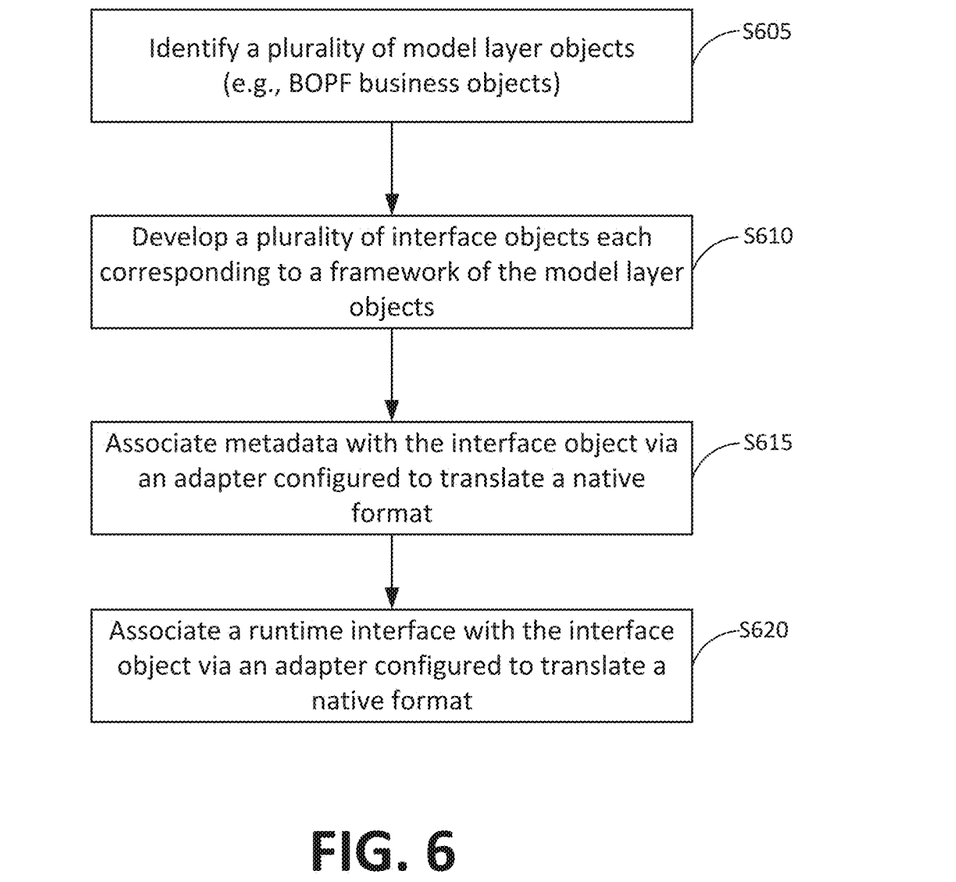
FIG. 6 illustrates a flowchart according to at least one example embodiment.
Figure 7:
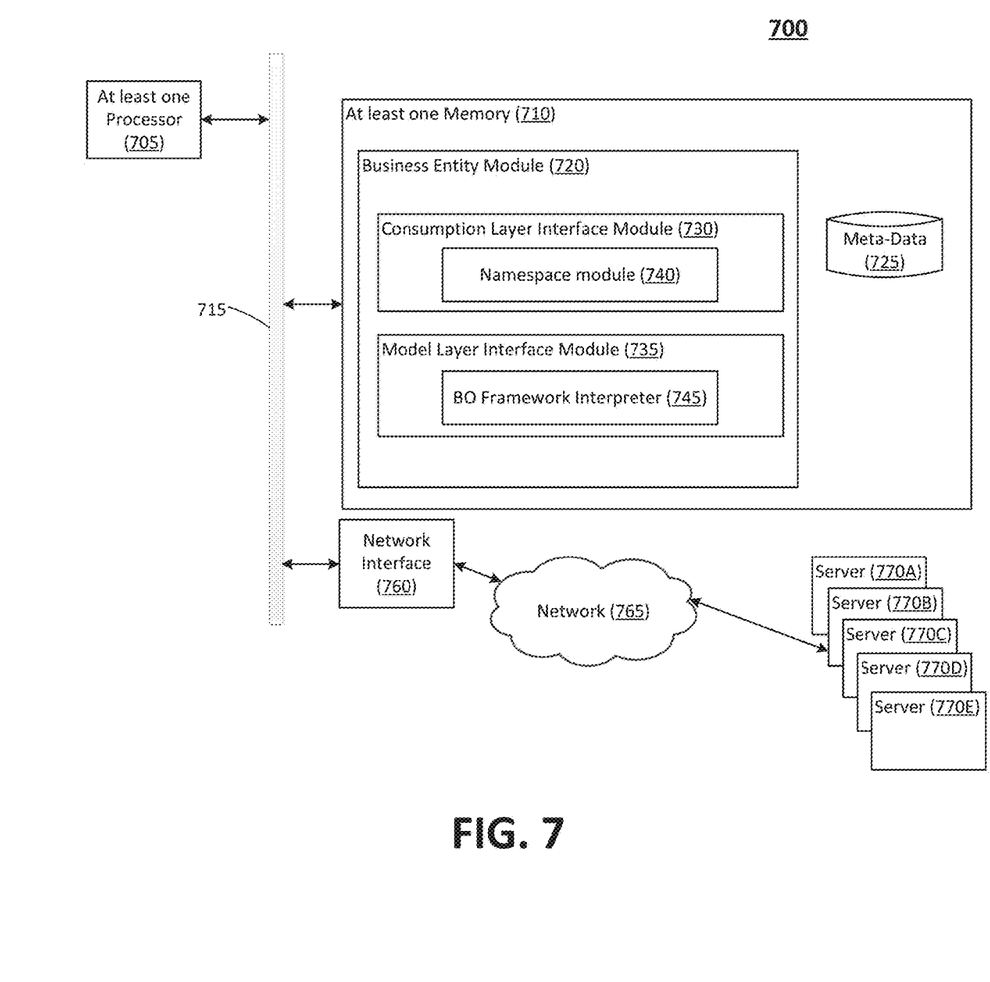
FIG. 7 illustrates a block diagram of a system according to at least one example embodiment.

FIG. 6 illustrates a flowchart according to at least one example embodiment. The steps described with regard to FIG. 6 may be performed due to the execution of software code stored in a memory (e.g., at least one memory 710) associated with an apparatus (e.g., as shown in FIG. 7) and executed by at least one processor (e.g., at least one processor 705) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 6.

As shown in FIG. 6, in step S605 a plurality of model layer objects are identified. At least two of the plurality of consumption layer objects and/or types are associated with a different framework and each of the plurality of consumption layer objects include a plurality of business objects. For example, a BOPF framework may be identified and subsequently selected to have associated business objects de-coupled from the framework such that a developer of a consumption layer object (using the new integration) needs no special knowledge of and/or special skill in order to utilize the business object.

In step S610 a plurality of interface objects are developed. Each of the plurality of interface objects correspond to a framework of the model layer objects. For example, an interface may be developed (e.g., dynamic and generic code) that identifies each business object associated with the model layer object (e.g., each business object implemented by the framework). In this example, a business object may be associated with a system (e.g., a sales order item business object associated with an ERP executing under a BOPF framework). According to at least one example embodiment, more than one system (e.g., sales order management (SO) systems, product management systems, inventory management systems, enterprise resource planning (ERP) systems, and the like) may be associated with a framework (e.g., BOPF). Accordingly, generating an interface may include generating more than one interface for an identified model layer object or framework.

Once each business object associated with the model layer object is identified, the interface is configured to implement each business object within the interface in a common mechanism, structure and/or language. For example, the interface may implement each business object using metadata (e.g., to access and/or by accessing a BOPF framework metadata) and using a runtime (e.g., to access and/or by accessing a BOPF service manager). Implementing each business object may include implementing each element (e.g., item and/or function) of the business object. Each of the plurality of interface objects may be configured to translate each of the business objects to a common intermediate representation. For example, a sales order item or an update sales order item associated with a sales order business object of an ERP may be implemented in the interface with the intermediate representation, common mechanism, structure and/or language. For example, each of the business objects may include data objects and the data objects may be translated into the intermediate representation by converting the data objects into a data structure (e.g., a common/generic data structure, a SADL data structure, an XML data structure).

In an example implementation, a business object includes a procedure. Accordingly, translating the business object into the intermediate representation may include translating code associated with the procedure into a string of symbols having a common or standard language (e.g., SADL, XML, C, basic). In an example implementation, business objects include relationships with other business objects (e.g., a sales order may have a related business partner). Therefore, translating the business objects into the intermediate representation may include a mapping of relationships between business objects. Translating the business object into the intermediate representation may include using a unique translation scheme for each framework.

In step S615 metadata is associated with the interface object. The interface object associates the metadata via an adapter configured to translate a native format. For example, metadata (e.g., metadata 455) may include any data and/or data associations for a runtime interface, the interface, and/or objects in the model layer (e.g., BOPF 425). For example, metadata may include business objects in an object in the model layer, business object associations (e.g., as an ER-diagram), elements of a business object (e.g., data objects), function calls (and their variables) in a business object, and/or the like. For example, metadata associated with a BOPF framework may include data (e.g., row or column) name settings, association(s), element(s), action(s) query(ies), key element(s) (e.g., primary key), type (e.g., data type), access control (field) settings, and the like. Associating metadata with the plurality of interface objects may include accessing framework (e.g., BOPF framework) metadata, specifying a SADL and/or XML data source.

In step S620 a runtime interface is associated with the interface object. The runtime interface associates services (e.g., function calls) via an adapter configured to translate a native format. For example, as described above, the runtime interface may be configured to interface with the interface and at least one consumption layer tool during an implemented operation (e.g., accessing data associated with a business object). Accordingly, associating the runtime interface with the interface object may include mapping elements (e.g., update item) between the interface and the runtime. The runtime may access a service manager (e.g., a BOPF service manager) for a model layer framework. For example, the runtime may access services such as read, create, update, delete, execute, get message, and the like.

For example, in an example implementation a developer (e.g., a framework developer or developer trained in a particular framework) implements the interface object as two interfaces as, for example, application programming interfaces (API) or adapters for the framework. The first interface includes the metadata for the framework and the second interface includes the runtime for the framework. The first interface (or metadata interface or metadata adapter) may be configured to map an access to the metadata of the (model layer) framework. The second interface (or runtime interface or runtime adapter) may be an API configured to access a service manager (e.g., a BOPF service manager) for the (model layer) framework.

FIG. 7 illustrates a block diagram of a system according to at least one example embodiment. As shown in FIG. 7, the system (or apparatus) 700 includes at least one processor 705 and at least one memory 710. The at least one processor 705 and the at least one memory 710 are communicatively coupled via bus 715. The system 700 may be, for example, an element of a computing device (e.g., a cloud computing device or a server).

In the example of FIG. 7, the system 700 may be at least one computing device and should be understood to represent virtually any computing device configured to perform the methods described herein. As such, the system 700 may be understood to include various standard components which may be utilized to implement the techniques described herein, or different or future versions thereof. By way of example, the system 700 is illustrated as including the at least one processor 705 (e.g., a silicon based processor), as well as the at least one memory 710 (e.g., a non-transitory computer readable storage medium) respectively.

Thus, as may be appreciated, the at least one processor 705 may be utilized to execute instructions stored on the at least one memory 710, so as to thereby implement the various features and functions described herein, or additional or alternative features and functions. Of course, the at least one processor 705 and the at least one memory 710 may be utilized for various other purposes. In particular, it may be appreciated that the at least one memory 710 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 710.

As shown in FIG. 7, the at least one memory 710 includes a business entity module 720 and a meta-data datastore 725. The business entity module 720 includes a consumption layer interface module 730 and a model layer interface module 735. The consumption layer interface module 730 includes a namespace module 740. The model layer interface module 735 includes a business object framework interpreter 745.

The system 700 may also include a network interface 760 communicatively coupled to bus 715. The network interface 760 is configured to interface with one or more servers 770A, 770B, 770C, 770D, 770E via network 765. Network 765 may be any network (e.g., internet or intranet). The servers 770A, 770B, 770C, 770D, 770E may be configured to implement at least one framework associated with a model layer (e.g., enterprise search model 415, BOL 420, BOPF 425, CDS 430, DDIC 435, SPI 440, and the like).

The business entity module 720 may be configured to publish business objects as and/or in association with a business entity. Accordingly, the model layer interface module 735 may be configured to interface with at least one model layer framework (e.g., enterprise search model 415, BOL 420, BOPF 425, CDS 430, DDIC 435, SPI 440, and the like). And, the consumption layer interface module 730 may be configured to interface with at least one consumption layer tool (e.g., FPM 405, GW 410, and the like).

The namespace module 740 may be configured to generate a namespace based on an intermediate representation of a business object. For example, a namespace can include a definition. A definition can contain a dataSource where the type of the data source (for example, a business object), the binding (for example an entry path of the business object) and a name (which can be used as alias), may be specified. A syntactic analysis may be performed on the data structure and/or the translated string of symbols to ensure uniqueness of each namespace.

The business object framework interpreter 750 may be configured to translate a business object into an intermediate representation. For example, the business object may include data objects (e.g., attributes that describe the object) and procedures (or methods). For example, as shown in FIG. 2 above, business object 205 may include a data object (or element) (e.g., business object item 210) including, for example, a "Status" and a procedure (method or action), for example, "Accept". The Accept procedure may be configured to change the "Status" to order accepted based on some criteria (e.g., customer pays a down payment). Translating the business object into an intermediate representation may include converting the data objects into a data structure or metadata. Translating the business object into an intermediate representation may include translating language (or code) associated with the procedure(s) into a string of symbols having a common or standard language (e.g., machine language or portable language). Translating the business object into an intermediate representation may include generating metadata including a mapping of relationships between business objects (e.g., a relationship between a sales order entry object and a sales order item object). Each framework may have a unique translation scheme.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
identifying a plurality of consumption layer objects as developer tools, at least two of the plurality of consumption layer objects being associated with a different framework and each of the plurality of consumption layer objects include a plurality of business objects;

generating a plurality of interface objects each configured to simultaneously provide an interface between two or more consumption layer objects and two or more frameworks, each of the plurality of interface objects being configured to translate each of the business objects to a common intermediate representation, each of the plurality of interface objects being implemented separate from the plurality of consumption layer objects and separate from the corresponding framework, wherein translating each of the business objects into the common intermediate representation includes converting data objects into metadata;

associating the metadata with the plurality of interface objects; and associating a runtime interface with the plurality of interface objects.

2. The method of claim 1, wherein translating each of the business objects into the intermediate representation includes converting data objects into a data structure.

3. The method of claim 1, wherein translating each of the business objects into the intermediate representation includes translating code associated with a procedure into a string of symbols having a common or standard language.

4. The method of claim 1, wherein translating each of the business objects into the intermediate representation includes a mapping of relationships between business objects.

5. The method of claim 1, wherein
translating each of the business objects into the intermediate representation includes using a unique translation scheme for each framework.

6. The method of claim 1, wherein translating each of the business objects into the intermediate representation includes generating a Service Adaptation Definition Language (SADL) definition for each of the business objects.

7. The method of claim 1, wherein associating metadata with the plurality of interface objects includes specifying a SADL data source.

8. The method of claim 1, wherein translating each of the business objects into the intermediate representation decouple each of the business objects from the associated framework used to implement each of the business objects.

9. A non-transitory computer-readable storage medium having stored thereon computer executable program code which, when executed on a computer system, causes the computer system to perform steps comprising:
identifying a plurality of consumption layer objects as developer tools, at least two of the plurality of consumption layer objects being associated with a different framework and each of the plurality of consumption layer objects include a plurality of business objects, each of the plurality of business objects including a data model, a function, a relationship to another of the business objects and a business logic;

generating a plurality of interface objects each configured to simultaneously provide an interface between two or more consumption layer objects and two or more frameworks, each of the plurality of interface objects being configured to translate each of the business objects to a common intermediate representation, each of the plurality of interface objects being implemented separate from the plurality of consumption layer objects and the corresponding framework, wherein translating each of the business objects into the common intermediate representation includes converting data objects into metadata;

associating the metadata with the plurality of interface objects; and associating a runtime interface with the plurality of interface objects.

10. The non-transitory computer-readable storage medium of claim 9, wherein translating each of the business objects into the intermediate representation includes converting data objects into a data structure.

11. The non-transitory computer-readable storage medium of claim 9, wherein translating each of the business objects into the intermediate representation includes translating code associated with a procedure into a string of symbols having a common or standard language.

12. The non-transitory computer-readable storage medium of claim 9, wherein translating each of the business objects into the intermediate representation includes a mapping of relationships between business objects.

13. The non-transitory computer-readable storage medium of claim 9, wherein translating each of the business objects into the intermediate representation includes using a unique translation scheme for each framework.

14. The non-transitory computer-readable storage medium of claim 9, wherein translating each of the business objects into the intermediate representation decouple each of the business objects from the associated framework used to implement each of the business objects.

15. An apparatus including a processor and a non-transitory computer readable medium, the apparatus comprising:

a business entity communicatively coupled between a plurality of consumption layer objects and a plurality of model layer objects, the business entity being configured to simultaneously provide an interface between two or more of the consumption layer objects and two or more frameworks associated with the model layer objects, the business entity being configured to independently implement the plurality of model layer objects in a common structure, the business entity including:

a plurality of interfaces configured to translate a business object in the corresponding one of the plurality of model layer objects, a runtime interface configured to access data associated with the business object associated with one or more of the of the plurality of model layer objects, and metadata associated with each of the plurality of interface objects, wherein translating each of the business objects includes converting data objects into the metadata, the metadata including references to the business entity, at least one business object association, elements of the business object and function calls in the business object.

16. The apparatus of claim 15, wherein the business entity is further configured to decouple each of the business objects from the associated framework used to implement each of the business objects.

17. The apparatus of claim 15, wherein the runtime accesses a service manager for a model layer framework to implement a service.

18. The apparatus of claim 15, wherein at least two of the plurality of consumption layer objects are associated with a different model layer framework and each of the plurality of consumption layer objects include a plurality of business objects.

* * * * *